US008649187B2

(12) United States Patent
Aiello et al.

(10) Patent No.: US 8,649,187 B2
(45) Date of Patent: Feb. 11, 2014

(54) TWO-TERMINAL M2LC SUBSYSTEM AND M2LC SYSTEM INCLUDING SAME

(75) Inventors: Marc Francis Aiello, Oakmont, PA (US); Dustin Matthew Kramer, Fort Collins, CO (US); Kenneth Stephen Berton, Greensburg, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 120 days.

(21) Appl. No.: 13/238,002

(22) Filed: Sep. 21, 2011

(65) Prior Publication Data

US 2012/0068756 A1   Mar. 22, 2012

Related U.S. Application Data

(60) Provisional application No. 61/384,853, filed on Sep. 21, 2010.

(51) Int. Cl.
*H02M 3/335* (2006.01)
*H02M 7/537* (2006.01)

(52) U.S. Cl.
USPC ............ 363/17; 363/65; 363/98; 363/131; 363/132

(58) Field of Classification Search
USPC ............................ 363/17, 65, 98, 131, 132
See application file for complete search history.

(56) References Cited

U.S. PATENT DOCUMENTS

| | | | |
|---|---|---|---|
| 5,155,675 A * | 10/1992 | Maruyama et al. | 363/98 |
| 5,459,655 A * | 10/1995 | Mori et al. | 363/132 |
| 6,480,403 B1 | 11/2002 | Bijlenga | |
| 6,545,452 B2 | 4/2003 | Bruckmann et al. | |
| 6,795,323 B2 * | 9/2004 | Tanaka et al. | 363/41 |
| 7,219,673 B2 * | 5/2007 | Lemak | 363/71 |
| 7,269,037 B2 | 9/2007 | Marquardt | |
| 7,577,008 B2 | 8/2009 | Hiller | |
| 7,782,639 B2 * | 8/2010 | Vinciarelli | 363/65 |
| 7,835,166 B2 | 11/2010 | Hiller | |
| 7,924,585 B2 | 4/2011 | Sommer | |
| 7,986,535 B2 * | 7/2011 | Jacobson et al. | 363/17 |
| 8,385,097 B2 * | 2/2013 | Asplund | 363/131 |
| 2004/0246755 A1 | 12/2004 | Isii et al. | |
| 2006/0006819 A1 | 1/2006 | Franck et al. | |
| 2006/0044857 A1 | 3/2006 | Lemak | |
| 2007/0159749 A1 | 7/2007 | Oka | |
| 2008/0123374 A1 * | 5/2008 | Vinciarelli | 363/65 |

(Continued)

FOREIGN PATENT DOCUMENTS

DE   10031778   1/2002
WO   2007028349   3/2007

OTHER PUBLICATIONS

Alves, et al., "Medium Voltage Industrial Variable Speed Drives", WEG Automação, Brazil, 2009.

(Continued)

*Primary Examiner* — Bao Q Vu
(74) *Attorney, Agent, or Firm* — Reed Smith LLP

(57) ABSTRACT

A two-level two-terminal modular multilevel converter subsystem. The subsystem includes a first capacitor and a second capacitor. The modular multilevel converter subsystem is configured to selectively place the first capacitor in series with the second capacitor. The modular multilevel converter subsystem is also configured to selectively place the first capacitor in parallel with the second capacitor relative to first and second output terminals of the modular multilevel converter subsystem.

20 Claims, 4 Drawing Sheets

(56) References Cited

U.S. PATENT DOCUMENTS

| | | | |
|---|---|---|---|
| 2008/0205093 A1 | 8/2008 | Davies et al. | |
| 2008/0232145 A1 | 9/2008 | Hiller et al. | |
| 2008/0259661 A1 | 10/2008 | Hiller et al. | |
| 2009/0021081 A1* | 1/2009 | Jacobson et al. | 307/77 |
| 2009/0021966 A1* | 1/2009 | Jacobson et al. | 363/52 |
| 2011/0002149 A1 | 1/2011 | Hiller et al. | |
| 2011/0018481 A1 | 1/2011 | Hiller | |
| 2011/0049994 A1 | 3/2011 | Hiller et al. | |
| 2011/0089873 A1 | 4/2011 | Blöcher et al. | |

OTHER PUBLICATIONS

Song, et al., "Multilevel Optimal Modulation and Dynamic Control Strategies for STATCOMs Using Cascaded Multilevel Inverters", IEEE Transactions on Power Delivery, vol. 22, No. 3, Jul. 2007, pp. 1937-1946.

Lesnicar, et al., "An Innovative Modular Multilevel Converter Topology Suitable for a Wide Power Range", Power Tech Conference Proceedings, 2003, IEEE Bologna, Vol, 3, Jun. 2003, pp. 1-6.

Allebrod, et al., "New Transformerless, Scalable Modular Multilevel Converters for HVDC-Transmission", IEEE; 2008; pp. 174-179.

Glinka, "Prototype of Multiphase Modular-Multilevel-Converter with 2MW power rating and 17-level-output-voltage", Power Electronics Specialist Conference, 2004 IEEE, vol. 4, pp. 2572-2576.

Marquardt, et al., "New Concept for High Voltage—Modular Multilevel Converter PESC 2004 Conference in Aachen, Germany", 2004.

Glinka, et al., "A New AC/AC Multilevel Converter Family", IEEE Transactions on Industrial Electronics, vol. 52, No. 3, Jun. 2005, pp. 662-669.

Search Report and Written Opinion for corresponding International Application No. PCT/US2011/052439 dated Jan. 20, 2012.

Shen et al., "Multi-Level DC/DC Power Conversion System with Multiple DC Sources", Dec. 2007; http://web.eecs.utk.edu/~tolbert/publicaTIONS/PESC_2007_fang_peng.pdf.

Khan, "Modular DC-DC Converters", Dissertation, May 2007, http://power.eecs.utk.edu/pubs/faisal_dissertation.

Seeman, Analytical and Practical Analysis of Switched-Capacitor DC-DC Converters, Sep. 1, 2006, http://www.eecs.berkeley.edu/Pubs/TechRpts/2006/EECS-2006-111.

International Preliminary Report on Patentability for corresponding International Application No. PCT/US2011/52439 dated Mar. 26, 2013.

* cited by examiner

TWO-TERMINAL M2LC SUBSYSTEM AND M2LC SYSTEM INCLUDING SAME

CROSS-REFERENCE TO RELATED APPLICATION

This application claims the benefit under 35 U.S.C. §119(e) of the earlier filing date of U.S. Provisional Patent Application No. 61/384,853 filed on Sep. 21, 2010.

BACKGROUND

This application discloses an invention which is related, generally and in various embodiments, to a two-terminal modular multilevel converter (M2LC) subsystem, and a M2LC system including a plurality of M2LC subsystems (cells).

Many papers have been published regarding the Modular Multilevel Converter (M2LC) topology. FIGS. 1 and 2 illustrate different two-level configurations of a two-terminal M2LC cell. In many instances, the M2LC cells shown in FIGS. 1 and 2 are packaged as a single three-level M2LC cell having two terminals as shown in FIG. 3.

As shown in FIG. 1, the M2LC cell includes two switching devices (Q1 and Q2), two diodes, a capacitor (C1) and two terminals. With the configuration shown in FIG. 1, the two switching devices can be controlled such that one of two different potentials may be present across the two terminals of the M2LC cell. The two different potentials are (1) zero volts and (2) $V_{C1}$ which is the voltage present on storage capacitor C1. If switching device Q2 is turned on, zero volts are present between the two terminals of the M2LC cell. If switching device Q1 is turned on, the voltage $V_{C1}$ is present between the two terminals of the M2LC cell. It will be appreciated that in order to avoid short circuiting of the storage capacitor C1 and the significant damage likely to result therefrom, switching device Q1 should be off when switching device Q2 is on, and switching device Q2 should be off when switching device Q1 is on.

Similarly, as shown in FIG. 2, the M2LC cell includes two switching devices (Q3 and Q4), two diodes, a capacitor (C2) and two terminals. With the configuration shown in FIG. 2, the two switching devices can be controlled such that one of two different potentials may be present across the two terminals of the M2LC cell. The two different potentials are (1) zero volts and (2) $V_{C2}$ which is the voltage present on storage capacitor C2. If switching device Q3 is turned on, zero volts are present between the two terminals of the M2LC cell. If switching device Q4 is turned on, the voltage $V_{C2}$ is present between the two terminals of the M2LC cell. It will be appreciated that in order to avoid short circuiting of the storage capacitor C2 and the significant damage likely to result therefrom, switching device Q3 should be off when switching device Q4 is on, and switching device Q4 should be off when switching device Q3 is on.

As shown in FIG. 3, the three-level M2LC cell includes four switching devices (Q1, Q2, Q3 and Q4), four diodes, two capacitors (C1 and C2) and two terminals. It will be appreciated that capacitors C1 and C2 are typically identical for this arrangement. With the configuration shown in FIG. 3, the four switching devices can be controlled such that one of three different potentials may be present across the two terminals of the M2LC cell. The three different potentials are (1) zero volts, (2) $V_{C1}$ which is the voltage present on storage capacitor C1 or $V_{C2}$ which is the voltage present on storage capacitor C2, and (3) $V_{C1}+V_{C2}$ which is the sum of the voltages present on storage capacitors C1 and C2. Because the two storage capacitors C1 and C2 are typically sized the same, it will be appreciated that the voltages $V_{C1}$ and $V_{C2}$ are substantially identical, and the voltage $V_{C1}+V_{C2}$ is substantially identical to either $2V_{C1}$ or $2V_{C2}$.

For the M2LC cell of FIG. 3, if switching devices Q2 and Q3 are both turned on, zero volts are present between the two terminals of the M2LC cell. If switching devices Q1 and Q3 are both turned on, the voltage $V_{C1}$ is present between the two terminals of the M2LC cell. If switching devices Q2 and Q4 are both turned on, the voltage $V_{C2}$ is present between the two terminals of the M2LC cell. If switching devices Q1 and Q4 are both turned on, the voltage $V_{C1}V_{C2}$ is present between the two terminals of the M2LC cell. It will be appreciated that the independent control of the two voltage states $V_{C1}$ and $V_{C2}$ allow for the balancing of the charges on capacitors C1 and C2. It should also be apparent to those skilled in the art of this topology that the functionality of the M2LC cell of FIG. 3 may be realized by connecting the two-level M2LC cells of FIGS. 1 and 2 in series so that the emitter connection of the switching device Q2 of the two-level M2LC cell of FIG. 1 is connected to the collector connection of the switching device Q3 of the two-level M2LC cell of FIG. 2 if the switch functions applied to switching devices Q1, Q2, Q3, and Q4 are identical. The advantage of the M2LC cell of FIG. 3 is primarily packaging and minimization of control since it is possible for this M2LC cell to share a single controller (not shown) as opposed to two independent controllers required for each of the M2LC cells of FIGS. 1 and 2.

It will be appreciated that the M2LC topology possesses the advantages of the Cascaded H Bridge (CCH) topology in that it is modular and capable of high operational availability due to redundancy. Additionally, the M2LC topology can be applied in common bus configurations with and without the use of a multi-winding transformer. In contrast to M2LC, CCH requires the utilization of a multi-winding transformer which contains individual secondary windings which supply input energy to the cells.

However, unlike CCH, the M2LC cells (or subsystems) are not independently supplied from isolated voltage sources or secondary windings. For a given M2LC cell, the amount of energy output at one of the two terminals depends on the amount of energy input at the other one of the two terminals.

Multiple M2LC cells have previously been arranged in a traditional bridge configuration. For such configurations, the M2LC cells are arranged into two or more output phase modules, each output phase module includes a plurality of series-connected M2LC cells, and each output phase module is further arranged into a positive arm (or valve) and a negative arm (or valve), where each arm (or valve) is separated by an inductive filter. Each output phase module may be considered to be a pole. The outputs of the respective output phase modules may be utilized to power an alternating current load such as, for example, a motor.

Although the M2LC cell arrangements described hereinabove have proven to be useful, the arrangements are not necessarily optimal for all potential applications. Additionally, from a size and cost standpoint, utilizing two identical storage capacitors to realize the respective voltage states adds more size and cost to the M2LC cells than is necessary.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 4:
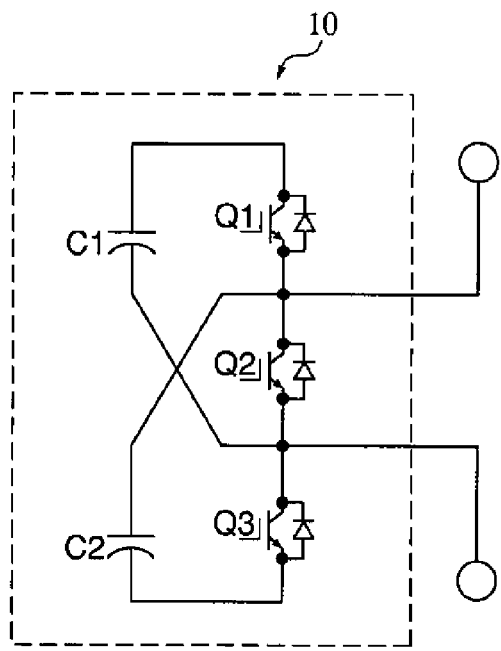
FIG. 4 illustrates various embodiments of a two-level configuration of an M2LC subsystem having two terminals.

FIG. 4 illustrates various embodiments of a two-level configuration of an M2LC subsystem 10 having two terminals. The M2LC subsystem 10 includes three switching devices (Q1, Q2 and Q3), three diodes, two capacitors (C1 and C2) and two terminals. The switching devices Q1-Q3 may be embodied as any suitable type of switching devices. For example, according to various embodiments, the switching devices Q1-Q3 are embodied as insulated gate bipolar transistors. According to various embodiments, switching devices Q1-Q3 can be configured with two dual insulated gate bipolar transistors such that the top of one pair and the bottom of the other pair are paralleled to form switching device Q2. Because switching device Q2 conducts more average current than either switching device Q1 or switching device Q3, this arrangement allows for "standard" insulated gate bipolar transistors to be utilized to safely handle the higher current associated with switching device Q2.

Figure 1:
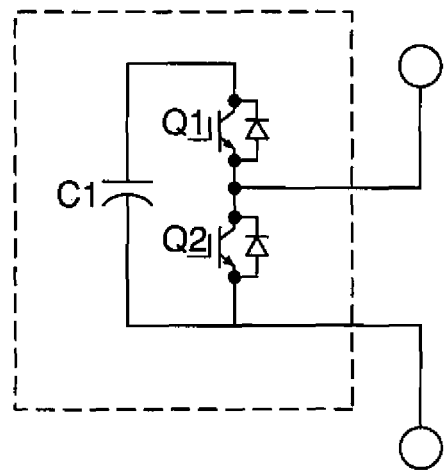
FIG. 1 illustrates a two-level configuration of an M2LC cell having two terminals.
Figure 2:
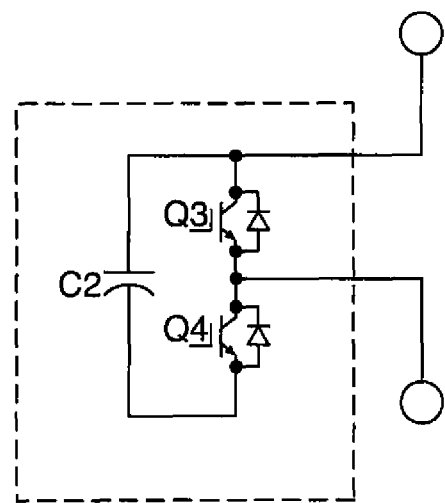
FIG. 2 illustrates another two-level configuration of an M2LC cell having two terminals.

With the configuration shown in FIG. 4, the three switching devices Q1-Q3 can be selectively controlled such that one of two different potentials may be present across the two terminals of the M2LC subsystem 10. The two different potentials are (1) zero volts and (2) $V_{C1}$ which is the voltage present on storage capacitor C1 or $V_{C2}$ which is the voltage present on storage capacitor C2. If switching device Q2 is turned on (and switching devices Q1 and Q3 are off), zero volts are present between the two terminals of the M2LC subsystem 10. Also, if switching device Q2 is turned on, the storage capacitors C1 and C2 are physically connected in series (but not with respect to the two output terminals). If switching devices Q1 and Q3 are both turned on (and switching device Q2 is off), the voltage present between the two terminals is the voltage $V_{C1}$ or the voltage $V_{C2}$. The voltages $V_{C1}$ and $V_{C2}$ are or will quickly become equal since the storage capacitors C1 and C2 are connected in parallel with respect to the two output terminals. In contrast to the storage capacitors C1 and C2 of the M2LC cells of FIGS. 1 and 2, it will be appreciated that the output current of the M2LC subsystem 10 is shared substantially equally by the storage capacitors C1 and C2 of the M2LC subsystem 10 if switching devices Q1 and Q3 are on (and switching device Q2 is off). According to various embodiments, capacitor C1 is sized the same as the capacitor C2.

Figure 3:
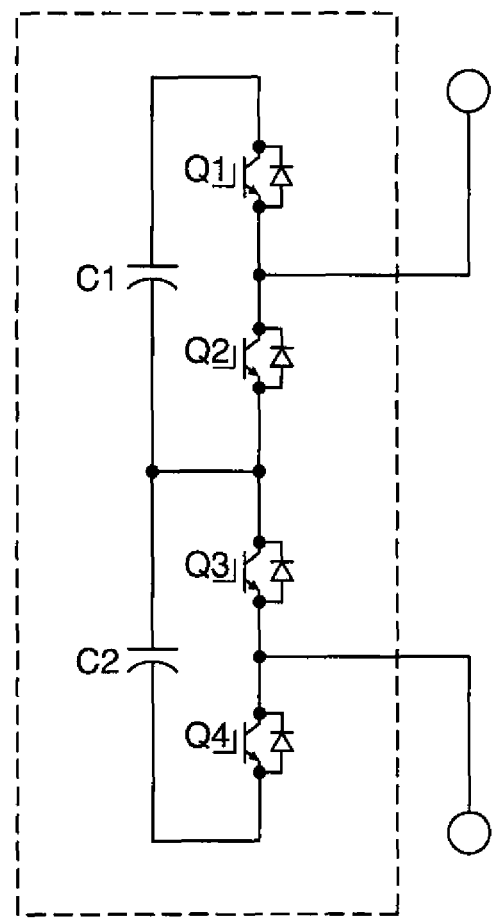
FIG. 3 illustrates a three-level configuration of an M2LC cell having two terminals.
Figure 5:
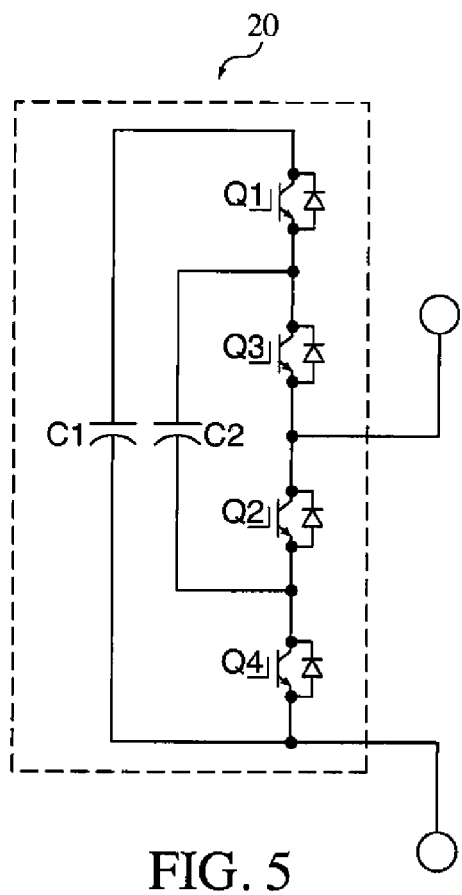
FIG. 5 illustrates various embodiments of a three-level configuration of an M2LC subsystem having two terminals.

FIG. 5 illustrates various embodiments of a three-level configuration of an M2LC subsystem 20 having two terminals. The M2LC subsystem 20 includes four switching devices (Q1, Q2, Q3 and Q4), four diodes, two capacitors (C1 and C2) and two terminals. In contrast to the two equal size storage capacitors of the M2LC cell shown in FIG. 3, the respective sizes of the two capacitors C1 and C2 of M2LC subsystem 20 are not the same. Capacitor C1 is a storage capacitor which conducts the fundamental output current of the m2LC subsystem 20 and capacitor C2 is a charge/pump capacitor or so-called "flying" capacitor which operates at the switching frequency of the switching devices Q1-Q4 and hence sees only harmonic currents associated with the switching frequency. Flying capacitor C2 does not conduct the fundamental output current and can be much smaller and less expensive than storage capacitor C1.

The switching devices Q1-Q4 may be embodied as any suitable type of switching devices. For example, according to various embodiments, the switching devices Q1-Q4 are embodied as insulated gate bipolar transistors. The four switching devices can be selectively controlled such that one of three different potentials may be present across the two terminals of the M2LC subsystem 20. The three different potentials are (1) zero volts, (2) $V_{C1}$ which is the voltage present on capacitor C1, and (3) $V_{C2}$ which is the voltage present on capacitor C2. The voltage $V_{C1}$ is double the voltage $V_{C2}$ (i.e., $V_{C1}=2V_{C2}$). The M2LC subsystem 20 can produce the potential $V_{C2}$ in two different ways and can be independently controlled to balance charges on the two capacitors C1 and C2.

The switching devices Q1-Q4 of M2LC subsystem 20 can be controlled so that the voltage present on storage capacitor C1 is $V_{C1}$, which is double the voltage $V_{C2}$ which can be present on flying capacitor C2. The voltage on flying capacitor C2 is controlled so that each switching device sees no more than $V_{C2}$. Stated differently, the voltage on flying capacitor C2 is controlled so that each switching device sees no more than one-half of $V_{C1}$. To accomplish this, storage capacitor C2 is controlled to voltage value $V_{C2}$. The M2LC subsystem 20 is arranged such that switching device Q1 is a complement of switching device Q2, and switching device Q3 is a complement of switching device Q4.

If switching devices Q2 and Q4 are both turned on, zero volts are present between the two terminals of the M2LC subsystem 20. If switching devices Q3 and Q4 are both turned on, the voltage present on the flying capacitor C2 ($V_{C2}$) is present between the two terminals of the M2LC subsystem 20. If switching devices Q1 and Q2 are both turned on, the voltage $V_{C1-C2}$, which is equal to the difference between the voltage $V_{C1}$ and the voltage $V_{C2}$ (i.e., $V_{C1-C2}$), is present between the two terminals of the M2LC subsystem 20. Since the voltage $V_{C1}$ is double the voltage $V_{C2}$, the difference between voltage $V_{C1}$ and voltage $V_{C2}$ is equal to voltage $V_{C2}$. If switching devices Q1 and Q3 are both turned on, the voltage $V_{C1}$ is present between the two terminals of the M2LC subsystem 20. Since the voltage $V_{C1}$ is double the voltage $V_{C2}$, it may also be stated that the voltage $2V_{C2}$ is present between the two terminals of the M2LC subsystem 20 if switching devices Q1 and Q3 are both turned on. In this way, the output voltage characteristic of the M2LC subsystem 20 of FIG. 5 is essentially identical to the output voltage characteristic of the M2LC cell of FIG. 3 in that it produces three voltage levels (e.g., zero volts, "v" volts ($V_{C2}$) or "2 v" volts ($V_{C1}$)) with two independent switching modes to produce "v" volts but it does so using a single storage capacitor C1 which conducts the fundamental output current produced at the output terminals of the M2LC subsystem 20.

Figure 6:
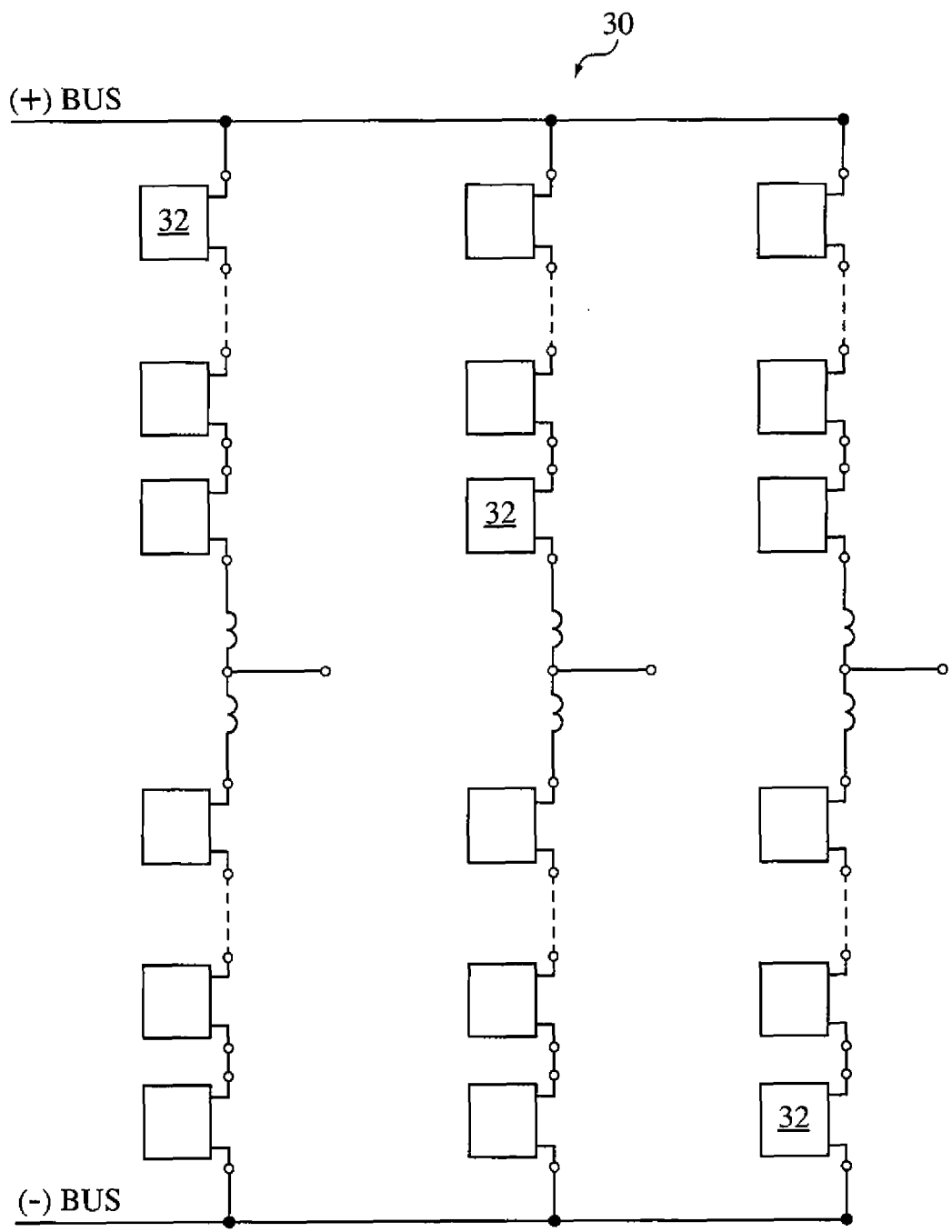
FIG. 6 illustrates various embodiments of a M2LC system.

FIG. 6 illustrates various embodiments of a M2LC system 30. The M2LC system 30 is configured as a three-phase bridge and includes a plurality of M2LC subsystems 32, where the M2LC subsystems 32 are arranged as three output phase modules and each individual M2LC subsystem 32 is embodied as either the M2LC subsystem 10 or the M2LC subsystem 20 described hereinabove with respect to FIGS. 4 and 5. Although eighteen M2LC subsystems 32 are shown in FIG. 6, it will be appreciated that the M2LC system 30 may include any number of M2LC subsystems 32. Of course, according to other embodiments, the M2LC system 30 may be configured differently than shown in FIG. 6. For example, the M2LC system 30 may be configured as two output phase modules.

For the M2LC system 30 of FIG. 6, the plurality of M2LC subsystems 32 are arranged as output phase modules. Each output phase module is further arranged into a positive arm (or valve) and a negative arm (or valve), where each arm (or valve) is separated by an inductive filter. According to other embodiments, for a given output phase module, in lieu of an inductive filter being connected between the positive arm and the negative arm of a the output phase module, one or more inductors may be distributed amongst the M2LC subsystems 32 of the arms of the output phase modules. Each output phase module may be considered to be a pole. Additionally, although not shown in FIG. 6 for purposes of clarity, it will be appreciated that each M2LC subsystem 32 also includes a local controller, and each local controller may be communicably connected to a higher level controller (e.g., a hub controller) of the M2LC system 30.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A system, comprising:
   a two-level two-terminal modular multilevel convert subsystem, comprising:
   a first switching device;
   a second switching device;
   a third switching device;
   a first capacitor in series with the first switching device; and
   a second capacitor in series with the third switching device, wherein:
      a terminal of the first capacitor is common with a terminal of the second switching device and a terminal of the third switching device; and
      a terminal of the second capacitor is common with a terminal of the first switching device and another terminal of the second switching device.

2. The system of claim 1, wherein the first and second capacitors share an output current of the modular multilevel converter subsystem substantially equally if the first and third switching devices are on and the second switching device is off.

3. The system of claim 1, wherein the first and second capacitors are sized the same.

4. The system of claim 1,
   wherein:
      a zero voltage is present between first and second output terminals of the modular multilevel converter subsystem if:
         the second switching device is on; and
         the first and third switching devices are off; and
      a non-zero voltage is present between the first and second output terminals of the modular multilevel converter subsystem if:
         the second switching device is off; and
         the first and third switching devices are on.

5. The system of claim 4, wherein at least one of the following is an insulated gate bipolar transistor:
   the first switching device;
   the second switching device; and
   the third switching device.

6. A system, comprising:
   a three-level two-terminal modular multilevel converter subsystem, comprising:
   a first switching device;
   a second switching device;
   a third switching device;
   a fourth switching device;
   a storage capacitor in series with the first switching device; and
   a flying capacitor, wherein:
      a terminal of the flying capacitor is common with a terminal of the first switching device and a terminal of the third switching device; and
      another terminal of the flying capacitor is common with a terminal of the second switching device and a terminal of the fourth switching device.

7. The system of claim 6, wherein:
   the storage capacitor conducts a fundamental output current of the modular multilevel converter subsystem; and
   the flying capacitor only conducts harmonic currents.

8. The system of claim 6, wherein the flying capacitor is sized smaller than the storage capacitor.

9. The system of claim 6,
   wherein the switching devices are configured for the subsystem to selectively generate a first voltage in two different ways.

10. The system of claim 9, wherein at least one of the following is an insulated gate bipolar transistor:
    the first switching device;
    the second switching device;
    the third switching device;
    the fourth switching device.

11. A modular multilevel converter system, comprising:
    a plurality of series-connected two-terminal modular multilevel converter subsystems, wherein at least one of the subsystems comprises:
    a first switching device;
    a second switching device;
    a third switching device;
    a first capacitor in series with the first switching device; and
    a second capacitor in series with the third switching device, wherein:

a terminal of the first capacitor is common with a terminal of the second switching device and a terminal of the third switching device; and a terminal of the second capacitor is common with a terminal of the first switching device and another terminal of the second switching device.

12. The modular multilevel converter system of claim 11, wherein the first and second capacitors share an output current of the at least one of the subsystems substantially equally if the first and third switching devices are on and the second switching device is off.

13. The modular multilevel converter system of claim 11, wherein the first and second capacitors are sized the same.

14. The modular multilevel converter system of claim 11, wherein:
a zero voltage is present between first and second output terminals of the at least one of the subsystems if:
the second switching device is on; and
the first and third switching devices are off; and
a non-zero voltage is present between the first and second output terminals of the at least one of the subsystems if:
the second switching device is off; and
the first and third switching devices are on.

15. The modular multilevel converter system of claim 14, wherein at least one of the following is an insulated gate bipolar transistor:
the first switching device;
the second switching device; and
the third switching device.

16. A modular multilevel converter system, comprising:
a plurality of series-connected two-terminal modular multilevel convert subsystems, wherein at least one of the subsystems comprises:
a first switching device;
a second switching device;
a third switching device;
a fourth switching device;
a storage capacitor in series with the first switching device; and
a flying capacitor, wherein:
a terminal of the flying capacitor is common with a terminal of the first switching device and a terminal of the third switching device; and
another terminal of the flying capacitor is common with a terminal of the second switching device and a terminal of the fourth switching device.

17. The modular multilevel converter system of claim 16, wherein:
the storage capacitor of the at least one of the subsystems conducts a fundamental output current of the at least one of the subsystems; and
the flying capacitor of the at least one of the subsystems only conducts harmonic currents.

18. The modular multilevel converter system of claim 16, wherein the flying capacitor of the at least one of the subsystems is sized smaller than the storage capacitor of the at least one of the subsystems.

19. The modular multilevel converter system of claim 16, wherein
the switching devices of the at least one of the subsystems are configured for the at least one of the subsystems to selectively generate a first voltage in two different ways.

20. The modular multilevel converter system of claim 19, wherein at least one of the following is an insulated gate bipolar transistor:
the first switching device;
the second switching device;
the third switching device; and
the fourth switching device.

* * * * *